(12) United States Patent
Hu

(10) Patent No.: US 11,789,851 B2
(45) Date of Patent: Oct. 17, 2023

(54) OFFLINE DEBUGGING METHOD

(71) Applicant: SHANGHAI NCATEST TECHNOLOGIES CO., LTD., Shanghai (CN)

(72) Inventor: Jack Hu, Shanghai (CN)

(*) Notice: Subject to any disclaimer, the term of this patent is extended or adjusted under 35 U.S.C. 154(b) by 62 days.

(21) Appl. No.: 17/426,109

(22) PCT Filed: Sep. 15, 2020

(86) PCT No.: PCT/CN2020/115336
§ 371 (c)(1),
(2) Date: Jul. 28, 2021

(87) PCT Pub. No.: WO2021/052325
PCT Pub. Date: Mar. 25, 2021

(65) Prior Publication Data
US 2022/0197782 A1 Jun. 23, 2022

(30) Foreign Application Priority Data

Sep. 16, 2019 (CN) .......................... 201910871139.6

(51) Int. Cl.
G06F 11/36 (2006.01)
(52) U.S. Cl.
CPC ...... G06F 11/3664 (2013.01); G06F 11/3624 (2013.01)
(58) Field of Classification Search
CPC ... G06F 11/36; G06F 11/3664; G06F 11/3624
See application file for complete search history.

(56) References Cited

U.S. PATENT DOCUMENTS 5,319,645 A * 6/1994 Bassi .................. G06F 11/3664
714/E11.21
7,039,568 B1 * 5/2006 Dye ....................... G06F 11/261
702/122

(Continued)

FOREIGN PATENT DOCUMENTS

CN 109213676 A * 1/2019
CN 110737590 A * 1/2020 .......... G06F 11/3624

(Continued)

Primary Examiner — Kamini B Patel
(74) Attorney, Agent, or Firm — TIANCHEN LLC.; Yuan R. Li

(57) ABSTRACT

The present invention discloses an offline debugging method, comprising: S01: obtaining interfaces which require return values in test flows of the test device; S02: setting the return value corresponding to each of the interfaces which require the return values, adding M debugging strategies and determining a debugging strategy required to be started; S03: compiling a configuration file comprises the M debugging strategies into an executable file required by the target platform; S04: setting up a virtual machine to fit the target platform, and transferring the executable file to the virtual machine; S05: invoking the test flow, returning the return value set by the debugging strategy corresponding to the interface which require the return value and obtaining an debugging result correspondingly. Therefore, the present invention solves a problem that debugging relays on hardware devices in semiconductor automation test, so as to reduce complexity and difficulty of debugging of a test device.

10 Claims, 2 Drawing Sheets

(56) References Cited

U.S. PATENT DOCUMENTS

| | | | | |
|---|---|---|---|---|
| 7,162,406 | B1* | 1/2007 | Dye | G06F 11/263 |
| | | | | 703/21 |
| 11,405,272 | B1* | 8/2022 | Khan | H04L 41/0895 |
| 2006/0129991 | A1* | 6/2006 | Kilian | G06F 11/3648 |
| | | | | 717/124 |
| 2009/0228748 | A1* | 9/2009 | Hagerott | G06F 11/2215 |
| | | | | 711/E12.001 |

FOREIGN PATENT DOCUMENTS

| | | | | | |
|---|---|---|---|---|---|
| CN | 113010413 | A | * | 6/2021 | G06F 11/3676 |
| CN | 114490337 | A | * | 5/2022 | |
| CN | 115168232 | A | * | 10/2022 | |

* cited by examiner

=Prior Art=

OFFLINE DEBUGGING METHOD

CROSS-REFERENCE TO RELATED APPLICATION

This application claims priority of International Patent Application Serial No. PCT/CN2020/115336, filed Sep. 15, 2020, which is related to and claims priority of Chinese patent application Serial No. 201910871139.6 filed on Sep. 16, 2019. The entirety of each of the above-mentioned patent applications is hereby incorporated herein by reference and made a part of this specification.

TECHNICAL FIELD

The disclosure relates to the technical field of semiconductor automated test device, in particular to an offline debugging method.

BACKGROUND

In semiconductor automated test, when no product is measured, an application software is required to monitor whether a test device meets test conditions, then a debugging test is required correspondingly. During the debugging test, test flows are used, which have many nodes.

Please refer to FIG. 1, which is a schematic diagram of a test flow in the semiconductor automated test. As shown in FIG. 1, each a node corresponds to a test item (TN1, TN2, TN3, TN4, TN5 and TN6), and each of the test items is set for a certain function point of the test device.

When running the test flow, each of the test items is executed in sequence, and regardless of success or failure of each of the test items, the test flow must continue to execute until finishing execution of the test flow, then debugging results are returned, sorted, classified and analysis.

However, operation of the test flow relies on a physical hardware device, which is expensive, and sustained debuggings will aggravate losses of the device and lead to economic costs. If the test flow is not run by the physical hardware device, and debugging results correspondingly are not returned, the test flow cannot be executed, which result in failures of the debuggings and testings.

In the prior art, solutions which comprise operation steps of directly returning in an program for each interface which requires a return value, there are so many shortcomings, such as when increasing number of the interfaces which require the return values, complexity grows linearly, and scalability is very low, which requires to modify the return value and underlying codes simultaneous, and an application program needs to be executed in a lower embedded system during a semiconductor test, once code modification is operated, a file conforms to a lower embedded level is needed to be recompiled and executed, which is cumbersome.

In addition, the solutions also comprise executing a test script, storing the return value required by a current interface in the test script, and returning the return value in the test script when invoking a real interface. The problems with the solutions are as follows, first, test scripts correspondingly are required for test situations, and then transferred to an lower computer for execution in turn, which is time consuming for a combination of multiple test conditions and frequent modifications of the return values set. Second, switching between a general platform and a specific platform (i.e., switching between a X86 platform and an ARM platform) in field of semiconductor automated testing cannot be solved, that is, the test scripts are only for local interfaces, in semiconductor automated tests, the tests are performed by the physical hardware device, a local platform is generally the X86 platform and an embedded single board is the ARM platform, then application programs of the X86 platform cannot be run directly by the embedded single board.

SUMMARY

The purpose of the present invention is to provide an off-line debugging method, which is used to solve problems of dependence of off-line debugging on hardware resources in semiconductor automated testing, so as to reduce complexity and difficulty of the off-line debugging of the test machine.

In order to achieve the above object, the present invention provides an offline debugging method, comprising following steps for an offline debugging of a test device based on a master control platform and a target platform:

S01: obtaining interfaces which require return values in test flows of the test device; each of the test flows comprises multiple test nodes, and each of the interfaces which require the return values is connected to a test node correspondingly;

S02: setting the return value corresponding to each of the interfaces which require the return values, adding M debugging strategies and determining a debugging strategy required to be started; M is a positive integer greater than 0;

S03: compiling a configuration file comprises the M debugging strategies into an executable file required by the target platform;

S04: setting up a virtual machine to fit the target platform, and transferring the executable file to the virtual machine;

S05: invoking the test flow corresponding to the debugging strategy required to be started in step S02, returning the return value set by the debugging strategy corresponding to the interface which require the return value and obtaining a debugging result correspondingly.

Further, the platform of the virtual machine is the same as the target platform.

Further, in step S03, a cross compiler is used to compile the configuration file into the executable file.

Further, the cross compiler is a GCC open source tool.

Further, in step S04, the executable file is transmitted to the virtual machine by network or a serial port.

Further, in step S05, when the return value returned by the interface which requires return value is under normal mode, the test flow runs smoothly, and the debugging result is output; when the return value returned by the interface which requires return value is under abnormal mode, the test flow is terminated.

Further, in step S02, starting N debugging strategies required, and N is a positive integer greater than 0 and less than or equal to M; in step S02 and step S05, invoking the M debugging strategies required sequentially.

Further, in step S02, starting an debugging strategy required, the return value returned by the interface which requires return value is under normal mode, the test flow runs smoothly, and the debugging result is output; the return value returned by the interface which requires return value is under abnormal mode, the test flow is terminated, then returning back to step S02 and resetting the return value corresponding to the interface which requires return value.

Further, the target platform is an X86 platform or an ARM platform.

Further, the master control platform is an X86 platform.

Beneficial effects of the present invention are: by introducing the offline debugging method, which adopts the virtual machine to simulate a real hardware device, so as to reduce dependence on the hardware device during debugging, and reduce production costs; Compared with an offline debugging method of the prior art, which can only work in a situation, the method of the invention can save and activate multiple the debugging strategies simultaneously, so as to greatly improve efficiency.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It is to be understood that "first", "second" and similar terms used in the specification and claims are not to represent any sequence, number or importance but only to distinguish different parts. Likewise, similar terms such as "a" or "an" also do not represent a number limit but represent "at least one". It is also to be understood that term "and/or" used in the present disclosure refers to and includes one or any or all possible combinations of multiple associated items that are listed.

Figure 2:
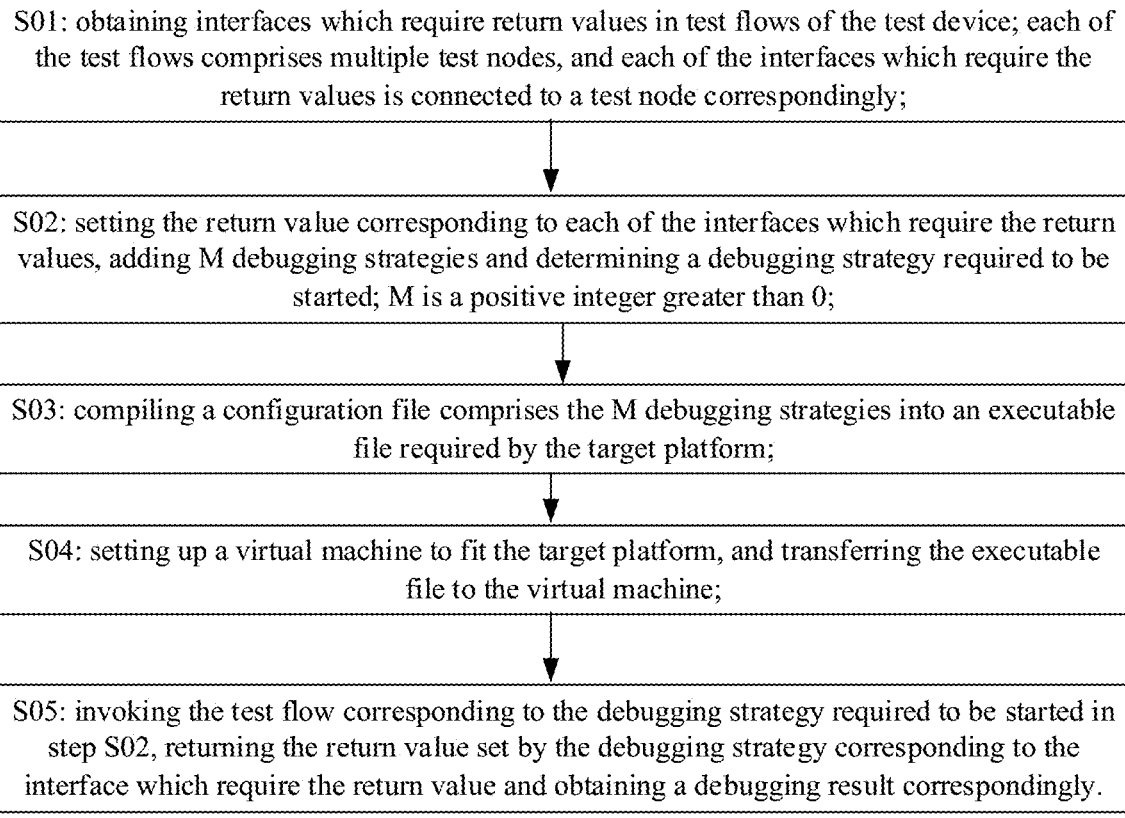
FIG. 2 is a flowchart of an offline debugging method in an embodiment of the present invention

Please refer to FIG. 2, which is a flowchart of an offline debugging method in an embodiment of the present invention. As shown in FIG. 2, the offline debugging method provided by the present invention is used for an offline debugging of a test device based on a master control platform and a target platform, and comprises following steps:

S01: obtaining interfaces which require return values in test flows of the test device; each of the test flows comprises multiple test nodes, and each of the interfaces which require the return values is connected to a test node correspondingly.

Figure 1:
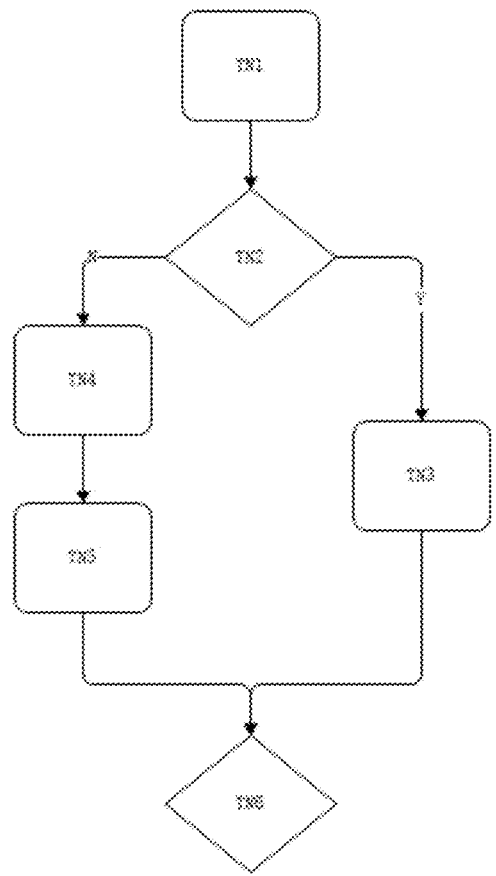
FIG. 1 is a schematic diagram of a test flow in semiconductor automated testing

As shown in FIG. 1, each of the test nodes corresponds to a test item TN, and each of the test items is tested or set for a certain function of a tested sample or test device, when debugging the test device, most of the test items are required to be back to test values, so as to ensure the entire test flows go smoothly. The present invention adopts an offline debugging method, which does not have the test values, in order to ensure progress of the test flows go smooth, the return value for each of the test items and the interfaces which require the return values are set. Wherein, a process of obtaining the interfaces which require the return values has been finished when the offline debugging program of the present invention is started.

In step S01, all the interfaces which require the return values in the test flows are required to be obtained, and each of the interfaces which require the return values is named to ensure uniqueness, so as to be used to set the return value corresponding to each of the interfaces which require the return values.

S02: setting the return value corresponding to each of the interfaces which require the return values, adding M debugging strategies and determining a debugging strategy required to be started; M is a positive integer greater than 0.

All the return values required possibly are set for each of the interfaces which require the return values, such as 0 or 1, etc., to form multiple debugging strategies. Wherein, the return value corresponding to each of the interfaces which require the return values in a debugging strategy is determined and unique, and permutations and combinations of the return values corresponding to different the interfaces which require different return values are multiple debugging strategies. Meanwhile, it is also necessary to select a debugging strategy required to be activated in the present invention. In the present invention, only one debugging strategy can be executed at a time, a enable signal is used to show the state of the debugging strategy required to be activated and started. By multiple executions, M the debugging strategies added are executed separately in the present invention, which solves a shortcoming that each a test item can only solve a debugging strategy in the prior art.

Figure 3:
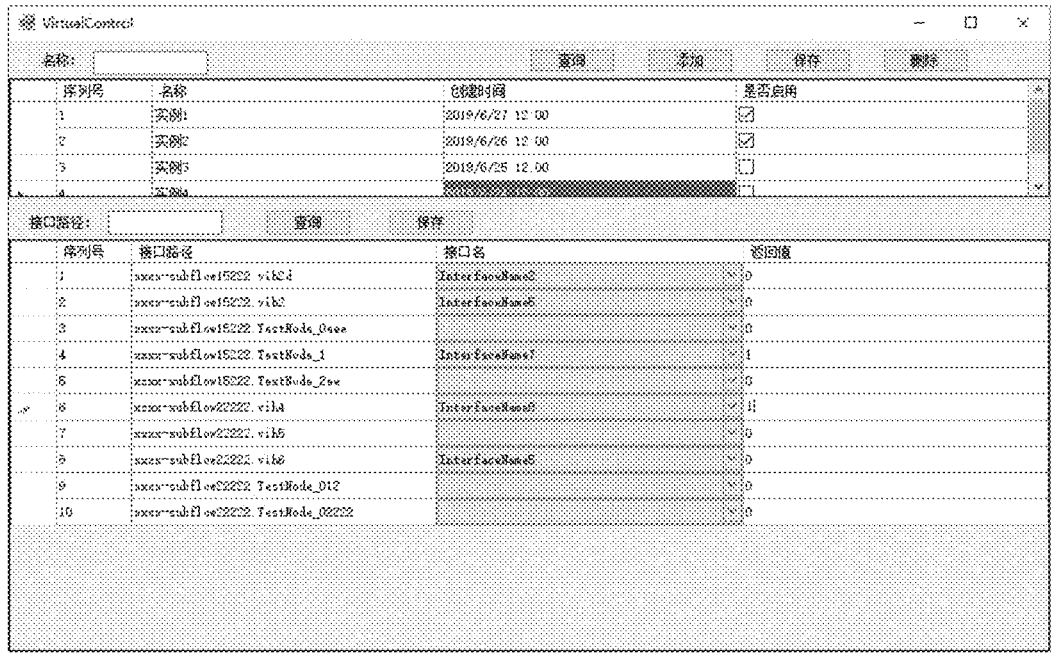
FIG. 3 is a schematic diagram of interface of an offline debugging program in an embodiment of the present invention

When setting the debugging strategies specifically, as shown in FIG. 3, the interfaces which require the return value are selected correspondingly, and the return values are set, multiple debugging strategies can be added at a time.

S03: compiling a configuration file comprises the M debugging strategies into an executable file required by the target platform.

In step S03, the configuration file comprised multiple the debugging strategies is saved, and then compiled to the executable file required by the target platform, wherein, the target platform refers to a platform of a hardware device that the test flows depend on during an actual test. For example, the configuration file of the debugging strategies mentioned above is generated on a X86 platform and the target platform is an ARM platform, the configuration file is required to be compiled to generate the executable file for the ARM platform. If the configuration file of the debugging strategies mentioned above is generated on the X86 platform and the target platform is the ARM platform, the executable file for the X86 platform is compiled and generated.

Wherein, the M debugging strategies obtained in FIG. 3 are saved as the configuration file. Preferably, a cross compiler can be used to compile the configuration file into the executable file. Further, the cross compiler can be a GCC (GNU Compiler Collection) open source tool.

S04: setting up a virtual machine to fit the target platform and transferring the executable file to the virtual machine.

In the present invention, the virtual machine can also be created in advance to fit the target platform, and platform of the virtual machine is the same as the target platform. If the target platform is a X86 platform, a virtual machine with a X86 platform is created, and if the target platform is an ARM platform, a virtual machine with an ARM platform is created. In field of semiconductor testing, generally, the target platform is the ARM platform, and the virtual machine for the ARM platform can be created at any time before or after steps S01, S02 and S03, the executable file compiled in S03 is transferred to the virtual machine by ways of network or a serial port. The virtual machine in S04 is used to complete operations that would otherwise require multiple physical hardware devices, so as to resolve any dependencies on the physical hardware devices.

S05: invoking the test flow corresponding to the debugging strategy required to be started in step S02, returning the return value set by the debugging strategy corresponding to the interface which require return value and obtaining a debugging result correspondingly.

Wherein, when the return value returned by the interface which requires the return value is under normal mode, the test flow runs smoothly, and the debugging result is output; when the return value returned by the interface which requires the return value is under abnormal mode, the test flow is terminated.

In the present invention, number of the debugging strategies which is required to be started is N, and N is a positive integer greater than 0 and less than or equal to M; in S05, the M debugging strategies required to be started is invoked sequentially. In step S02, if an debugging strategy is required to be started, when the return value returned by the interface which requires the return value is under normal mode, the test flow runs smoothly, and the debugging result is output; when the return value returned by the interface which requires the return value is under abnormal mode, the test flow is terminated, then returned back to step S02 and the return value corresponding to the interface which requires the return value is reset. If the debugging strategy which is required to be started in step S02 includes all combinations of the return values corresponding to all interfaces which require the return values, when the return value returned by the interface which requires the return value is under normal mode, the test flow runs smoothly, and the debugging result is output; when the return value returned by the interface which requires the return value is under abnormal mode, the test flow is terminated, and the debugging strategy is ended.

When the return value is under normal mode, the test flow in FIG. 1 is executed and started from TN1, and after TN2 is executed, tests of TN3 or TN4 are judged to be selected and executed, and then TN6. is executed along the test flow. Each TN is a test item, and finally a debugging result can be obtained through the return values in all the debugging strategies.

The invention introduces an offline debugging method, which adopts the virtual machine to simulate a real hardware device, so as to reduce dependence on the hardware device during debugging, and reduce production costs; Compared with an off-line debugging method of the prior art, which can only work in a situation, the method of the invention can save and activate multiple the debugging strategies simultaneously, so as to greatly improve efficiency.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An offline debugging method, comprising following steps for an offline debugging of a test device based on a master control platform and a target platform:

S01: obtaining interfaces which require return values in test flows of the test device; each of the test flows comprises multiple test nodes, and each of the interfaces which require the return values is connected to a test node correspondingly;

S02: setting the return value corresponding to each of the interfaces which require the return values, adding M debugging strategies and determining a debugging strategy required to be started; M is a positive integer greater than 0;

S03: compiling a configuration file comprises the M debugging strategies into an executable file required by the target platform;

S04: setting up a virtual machine to fit the target platform, and transferring the executable file to the virtual machine;

S05: invoking the test flow corresponding to the debugging strategy required to be started in step S02, returning the return value set by the debugging strategy corresponding to the interface which require the return value and obtaining a debugging result correspondingly.

2. The offline debugging method of claim 1, wherein a platform of the virtual machine is same as the target platform.

3. The offline debugging method of claim 1, wherein in step S03, a cross compiler is used to compile the configuration file into the executable file.

4. The offline debugging method of claim 3, wherein the cross compiler is a GCC open source tool.

5. The offline debugging method of claim 1, wherein in step S04, the executable file is transmitted to the virtual machine by network or a serial port.

6. The offline debugging method of claim 1, wherein in step S05, when the return value returned by the interface which requires return value is under normal mode, the test flow runs smoothly, and the debugging result is output; when the return value returned by the interface which requires return value is under abnormal mod, the test flow is terminated.

7. The offline debugging method of claim 6, wherein in step S02, starting N debugging strategies required, and N is a positive integer greater than 0 and less than or equal to M; in step S02 and step S05, invoking the M debugging strategies required sequentially.

8. The offline debugging method of claim 6, wherein in step S02, starting an debugging strategy required, the return value returned by the interface which requires return value is under normal mode, the test flow runs smoothly, and the debugging result is output; the return value returned by the interface which requires return value is under abnormal mod, the test flow is terminated, then returning back to step S02 and resetting the return value corresponding to the interface which requires return value.

9. The offline debugging method of claim 1, wherein the target platform is an X86 platform or an ARM platform.

10. The offline debugging method of claim 1, wherein the master control platform is an X86 platform.

* * * * *